(12) United States Patent
Diesing et al.

(10) Patent No.: US 7,866,339 B2
(45) Date of Patent: Jan. 11, 2011

(54) PRESSURE REGULATOR FOR A FUEL SUPPLY UNIT

(75) Inventors: Detlev Diesing, Hattersheim (DE); Karl Eck, Frankfurt (DE); René Schmid, Frankfurt am Main (DE)

(73) Assignee: Siemens Aktiengesellschaft, Munich (DE)

( * ) Notice: Subject to any disclaimer, the term of this patent is extended or adjusted under 35 U.S.C. 154(b) by 626 days.

(21) Appl. No.: 11/664,427

(22) PCT Filed: Sep. 8, 2005

(86) PCT No.: PCT/EP2005/054453

§ 371 (c)(1),
(2), (4) Date: Mar. 30, 2007

(87) PCT Pub. No.: WO2006/037708

PCT Pub. Date: Apr. 13, 2006

(65) Prior Publication Data

US 2007/0295409 A1 Dec. 27, 2007

(30) Foreign Application Priority Data

Oct. 1, 2004 (DE) ........................ 10 2004 048 386

(51) Int. Cl.
*F16K 31/126* (2006.01)

(52) U.S. Cl. ...................... 137/509; 137/508; 251/85; 251/86; 123/459; 123/463

(58) Field of Classification Search .................. 137/508, 137/509, 510; 251/85, 86; 123/459, 463
See application file for complete search history.

(56) References Cited

U.S. PATENT DOCUMENTS

| 4,164,237 | A | * | 8/1979 | Amey .......................... 137/510 |
| 4,408,745 | A | * | 10/1983 | Swiers et al. ............... 251/357 |
| 4,741,360 | A | * | 5/1988 | Affeldt et al. ............... 137/510 |
| 4,903,721 | A | | 2/1990 | Maier |
| 5,193,576 | A | * | 3/1993 | Mosby ....................... 137/510 |
| 5,394,900 | A | * | 3/1995 | Okuyama et al. ........... 137/510 |
| 5,429,094 | A | | 7/1995 | Akiba et al. |
| 5,435,344 | A | | 7/1995 | Robinson et al. |
| 5,435,345 | A | * | 7/1995 | Robinson et al. ............ 137/508 |
| 5,509,444 | A | * | 4/1996 | Robinson et al. ............ 137/508 |
| 5,520,215 | A | | 5/1996 | Haboush |
| 5,901,742 | A | * | 5/1999 | Kleppner et al. ............ 137/508 |
| 6,006,781 | A | * | 12/1999 | Brandt et al. ............. 137/493.6 |

(Continued)

FOREIGN PATENT DOCUMENTS

DE 198 49 849 A1 5/2000

(Continued)

*Primary Examiner*—Stephen Hepperle
*Assistant Examiner*—William McCalister
(74) *Attorney, Agent, or Firm*—Cohen Pontani Lieberman & Pavane LLP

(57) ABSTRACT

Disclosed is a pressure regulator for a fuel supply unit of a motor vehicle comprising a valve for joining a connection to an outlet above a designated pressure in the connection, a valve body and a valve seat, and a spring element for prestressing the valve body against the valve seat, characterized in that the valve body is designed as a sheet-metal part.

17 Claims, 2 Drawing Sheets

U.S. PATENT DOCUMENTS

| | | |
|---|---|---|
| 6,325,048 B1 | 12/2001 | Robinson |
| 6,330,878 B1 | 12/2001 | Perry et al. |
| 6,382,183 B1 * | 5/2002 | Preston et al. .............. 123/457 |

FOREIGN PATENT DOCUMENTS

| | | |
|---|---|---|
| DE | 101 54 680 A1 | 5/2002 |
| EP | 0 636 785 A1 | 2/1995 |
| JP | 61-232377 | 10/1986 |
| JP | 8-86368 | 4/1996 |
| JP | 10-288267 | 10/1998 |
| JP | 10-288268 | 10/1998 |
| JP | 2001-214981 | 8/2001 |

* cited by examiner

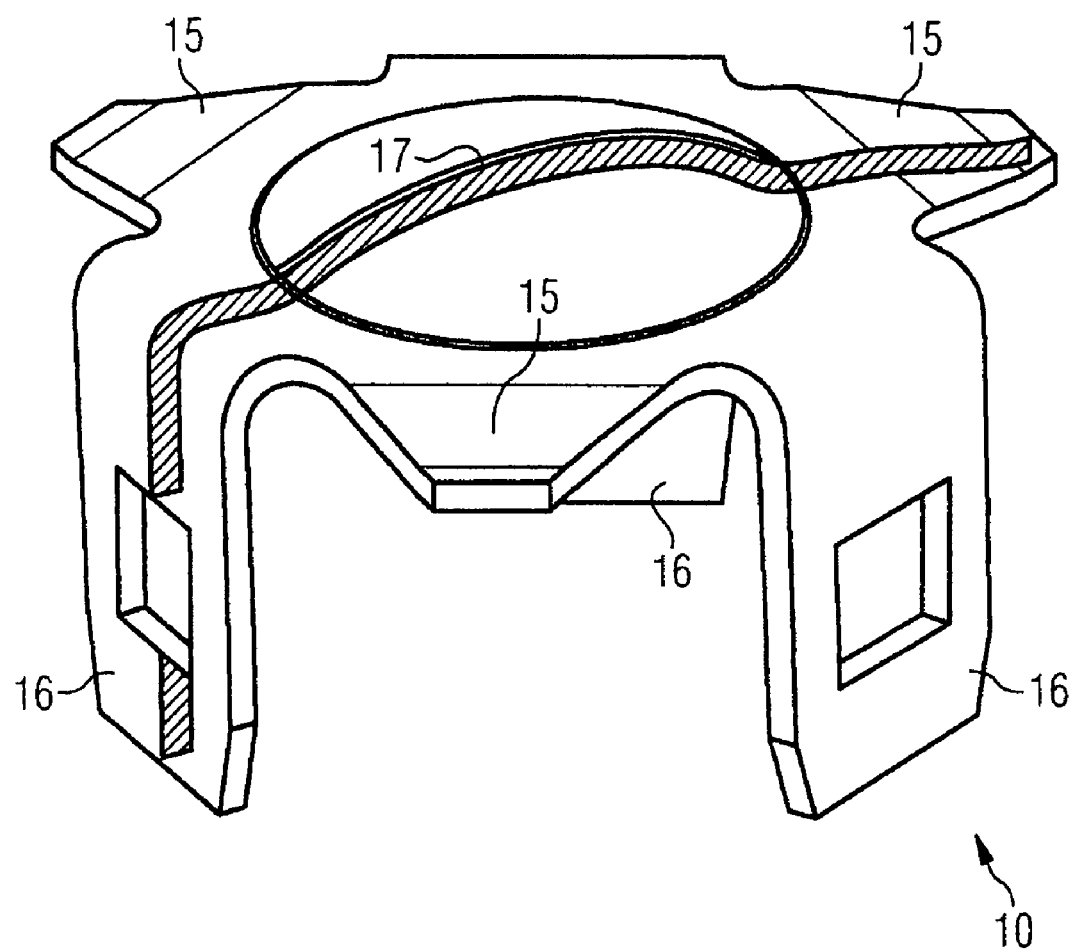

PRESSURE REGULATOR FOR A FUEL SUPPLY UNIT

BACKGROUND OF THE INVENTION

The invention relates to a pressure regulator for a fuel supply unit of a motor vehicle, with a valve for joining a connection to an outlet above a designated pressure in the connection, with a valve body and a valve seat, and with a spring element for prestressing the valve body against the valve seat.

Pressure regulators of this type are frequently used in motor vehicles nowadays to regulate a pressure in a forward flow line leading to an internal combustion engine, and are known from practice. The valve body is generally designed as a ball and provides a seal in relation to the valve seat below a designated pressure. The outlet is arranged on that side of the valve seat which lies opposite the connection. Above the designated pressure, the ball is raised from the valve seat by the pressure in the connection such that fuel can flow to the outlet. For the required tightness, the ball has to have particularly precise dimensions and a surface with as little surface roughness as possible. The ball is therefore generally polished or lapped.

A drawback of the known pressure regulator is that it requires a very complicated manufacturing process to produce the valve body. Furthermore, the valve body, which is designed as a ball, requires complicated guidance in the pressure regulator.

The invention is based on the problem of designing a pressure regulator of the type mentioned at the beginning in such a manner that it is constructed in a particularly simple manner structurally and is cost-effective to manufacture.

BRIEF DESCRIPTION OF THE INVENTION

This problem is solved according to the invention in that the valve body is designed as a sheet-metal part.

This design enables the valve body to be guided in a particularly simple manner. Since the sheet-metal part can be manufactured to be substantially lighter and flatter than the ball of the known pressure regulator, the pressure regulator according to the invention has particularly small dimensions. Furthermore, the valve body can be manufactured particularly cost-effectively, for example by punching. By this means, the pressure regulator according to the invention is constructed in a particularly simple manner structurally and can be manufactured cost-effectively.

Tolerance compensation between the valve seat, which is arranged on a bore, and the valve body can be produced in a simple manner, according to an advantageous development of the invention, if the valve body is in the form of a spherical cap on its side facing the valve seat. A further substantial advantage is that the spherical cap has a smaller axial extent than a ball, as a result of which the valve body according to the invention can be designed to be particularly flat, and therefore the valve body requires less constructional space in the axial extent. In addition, the spherical cap can be manufactured in a simple manner by deformation of the sheet-metal part.

The installation of the valve body turns out to be particularly simple, according to another advantageous development of the invention, if the valve body has latching hooks for securing on a support part.

The joining of the latching hooks to the support part is simplified if the support part has correspondingly designed receptacles for the latching hooks.

According to another advantageous development of the invention, the valve body does not require a complicated guide if the latching hooks have a designated play, in particular radial play, in relation to the support part. This has the advantage that, as a result of the play, radial tolerance compensation is made possible.

In addition to the radial tolerance compensation, tolerances in the axial extent between the valve body and the valve seat can also be compensated for in a simple manner by, according to another advantageous development of the invention, the valve body having spring tongues supported on the support part. Use is made here of the fact that the latching hooks of the valve body have axial play in relation to the receptacles on the support part. The valve body can thereby be prestressed axially in interaction with the striking of the latching hooks against the support part and the spring tongues.

A further advantage of the spring tongues is that a particularly shallow characteristic curve of the pressure regulator can be achieved therewith, since the spring tongues also raise the valve body when the piston is moved upwards.

The valve body can be prestressed and/or guided in a tilt-free manner, according to another advantageous development of the invention, if it has at least three spring tongues and/or at least three latching hooks.

According to another advantageous development of the invention, a torsion-resistant securing of the valve body can be produced with particularly little structural outlay if the spring tongues and the latching hooks are distributed in an alternating manner over the circumference of the valve body.

In the case of the known pressure regulator, when the valve body, which is designed as a ball, strikes against the valve seat, annoying noises arise. Noises can be reliably avoided, according to another advantageous development of the invention, if that side of the valve body which faces the valve seat has a coating. Furthermore, this ensures reliable tightness in the connection at low pressures.

The tightness of the valve body in relation to the valve seat is further increased, according to another advantageous development of the invention, if the coating is produced from an elastomer. In particular, acrylonitrile-butadiene-rubber (NBR) or fluorocaoutchouc, which is known under the trade name Viton, are suitable as a coating for a high degree of tightness, low tendency of the valve body to stick on the valve seat and low noise emission.

BRIEF DESCRIPTION OF THE DRAWINGS

The invention permits numerous embodiments. To further clarify its basic principle, one of these is illustrated in the drawing and is described below. In the drawing FIG. 2 shows a greatly enlarged, perspective illustration of a valve body of the pressure regulator according to the invention from FIG. 1.

DETAILED DESCRIPTION OF THE INVENTION

Figure 1:
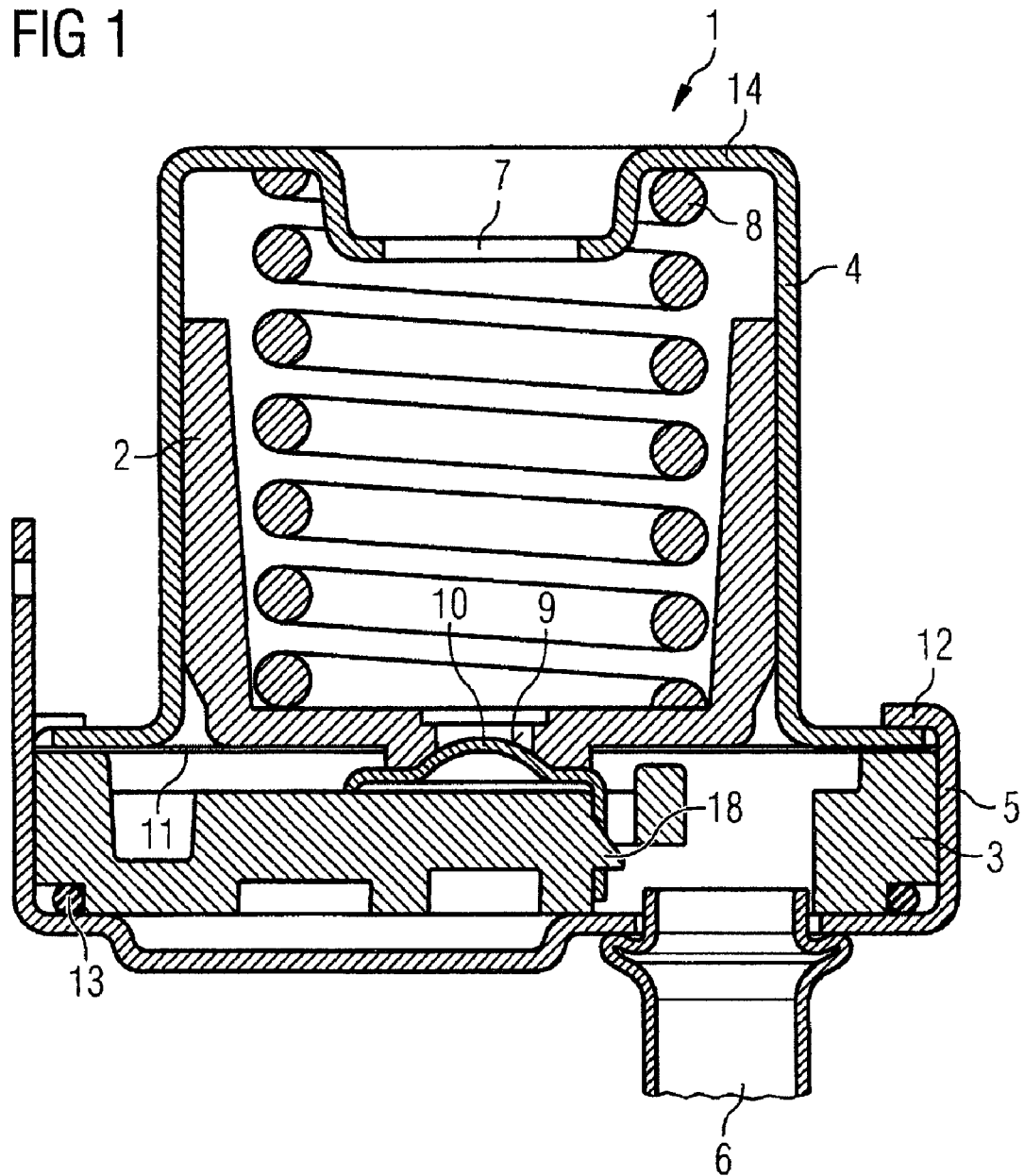
FIG. 1 shows a longitudinal section through a pressure regulator according to the invention.

FIG. 1 shows a pressure regulator, according to the invention and designed as a through flow valve, with a housing 1 and a piston 2 arranged displaceably in the housing 1. The pressure regulator serves to limit a maximum pressure in a forward flow line (not illustrated) of a fuel tank of a motor vehicle. The housing 1 has two housing parts 4, 5 kept at a distance by a support part 3. The pressure regulator has a connection 6 for a pressure line, and an outlet 7. The piston 2 is prestressed with a valve seat 9 against a valve body 10 by means of a spring 8 designed as a helical spring.

A membrane 11, which is connected to the support part 3 and the piston 2, seals off the region below the piston 2 from the region above the piston 2. This ensures that, when there is a pressure in the connection 6, the piston 2 is loaded counter to the force of the spring 8 and, above a designated pressure, the piston 2 is moved such that the valve seat 9 lifts off from the valve body 10. Therefore, above the designated pressure, fuel can escape from the connection 6 through the outlet 7. The housing parts 4, 5 are manufactured from steel sheet and are joined to each other by a flanging 12. By means of the flanging 12, a sealing ring 13 is prestressed against the support part 3 and the lower housing part 5. An edge 14 of the upper housing part 4, which edge holds the spring 8, is designed such that it is plastically deformable and serves to calibrate the pressure regulator and therefore to set the designated pressure at which the join between the connection 6 and the outlet 7 is produced.

The valve body 10 is designed as a sheet-metal part and has spring tongues 15 and latching hooks 16. The valve body 10 is joined to the support part 3 by the latching hooks 16, with the latching hooks 16 being in engagement with receptacles 18 of the support part 3. The latching hooks 16 are designed with radial and axial play with respect to the receptacles 18. The valve body 10 is prestressed in the axial direction via the spring tongues 15 and the latching hooks 16, which bear against the receptacles 18, with the spring tongues 15 permitting a slight movement of the valve body 10 in the axial direction. The free end of the spring tongues 15 is arranged in a radially displaceable manner thereto on the support part 3. As a result of the radial play of the latching hooks 16 in relation to the receptacles 18 on the support part 3, the valve body 10 is also arranged movably in the radial direction, and therefore the radial tolerance compensation is possible as a result. Furthermore, FIG. 1 shows that that region of the valve body 10 which is opposite the valve seat 9 is designed as a spherical cap.

FIG. 2 shows a greatly enlarged perspective illustration of the valve body 10, which is designed as a sheet-metal part, from FIG. 1. To clarify the shape of the valve body 10, a section is shown in the illustration. It can be seen here that the valve body 10 has three latching hooks 16 and spring tongues 15 in each case. The latching hooks 16 and the spring tongues 15 are each distributed at distances of 120° over the circumference of the valve body 10 and are arranged in an alternating manner to one another. Furthermore, FIG. 2 shows that the valve body 10 has a coating 17 of an elastomer on its side facing the valve seat 9 illustrated in FIG. 1.

The invention claimed is:

1. A pressure regulator for a fuel supply unit of a motor vehicle, comprising:
    a valve for joining a connection to an outlet above a designated pressure in the connection;
    a valve body;
    a moveable valve seat;
    a spring element for prestressing the valve seat against the valve body; and
    a support part joined to the valve body and arranged within the pressure regulator to maintain two opposing housing parts of the pressure regulator at a spaced apart distance from each other;
    wherein the valve body is a sheet-metal part.

2. The pressure regulator as claimed in claim 1, wherein the valve body comprises a spherical cap on a side of the valve body facing the valve seat.

3. The pressure regulator as claimed in claim 1, wherein that side of the valve body which faces the valve seat is provided with a coating.

4. The pressure regulator as claimed in claim 3, wherein the coating is produced from an elastomer.

5. The pressure regulator as claimed in claim 1, wherein the valve body includes latching hooks for securing the valve body on the support part within the pressure regulator.

6. The pressure regulator as claimed in claim 5, wherein the support part includes receptacles for receiving the latching hooks of the valve body.

7. The pressure regulator as claimed in claim 5, wherein the latching hooks are provided with at least one of radial and axial play in relation to the support part within the pressure regulator.

8. The pressure regulator as claimed in claim 5, wherein the valve body includes spring tongues which are supported on the support part within the pressure regulator.

9. The pressure regulator as claimed in claim 8, wherein ends of the spring tongues are arranged in at least one of a radially and axially displaceable manner in the support part within the pressure regulator.

10. The pressure regulator as claimed in claim 8, wherein the valve body includes one of at least three spring tongues and at least three latching hooks.

11. The pressure regulator as claimed in claim 8, wherein the spring tongues and the latching hooks are distributed in an alternating manner over a circumference of the valve body.

12. A pressure regulator for a fuel supply unit of a motor vehicle, comprising:
    a valve for joining a connection to an outlet above a designated pressure in the connection;
    a valve body having latching hooks for securing the valve body on a support part of the pressure regulator;
    a moveable valve seat; and
    a spring element for prestressing the valve seat against the valve body;
    wherein the valve body is a sheet-metal part including spring tongues which are supported on the support part within the pressure regulator.

13. The pressure regulator as claimed in claim 12, wherein the support part includes receptacles for receiving the latching hooks of the valve body.

14. The pressure regulator as claimed in claim 12, wherein the latching hooks are provided with at least one of radial and axial play in relation to the support part within the pressure regulator.

15. The pressure regulator as claimed in claim 12, wherein ends of the spring tongues are arranged in at least one of a radially and axially displaceable manner in the support part within the pressure regulator.

16. The pressure regulator as claimed in claim 12, wherein the valve body includes one of at least three spring tongues and at least three latching hooks.

17. The pressure regulator as claimed in claim 12, wherein the spring tongues and the latching hooks are distributed in an alternating manner over a circumference of the valve body.

* * * * *